Dec. 14, 1971          N. B. WEBB ET AL          3,627,538
                METHOD OF PRODUCING A SAUSAGE EMULSION
Filed June 17, 1969                                3 Sheets-Sheet 1
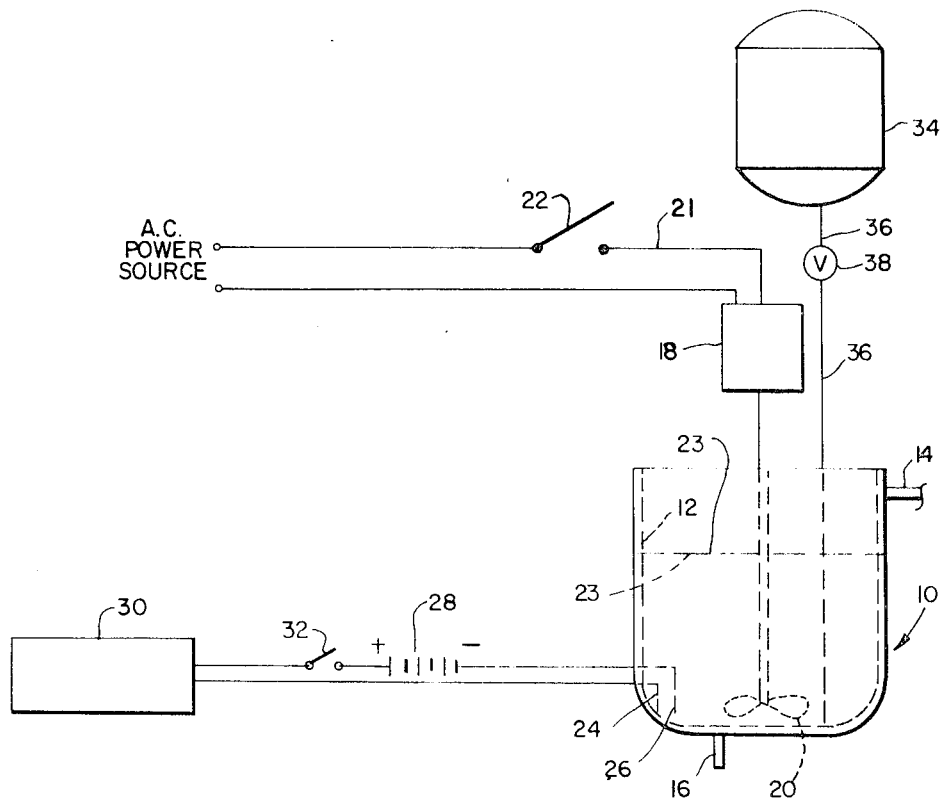
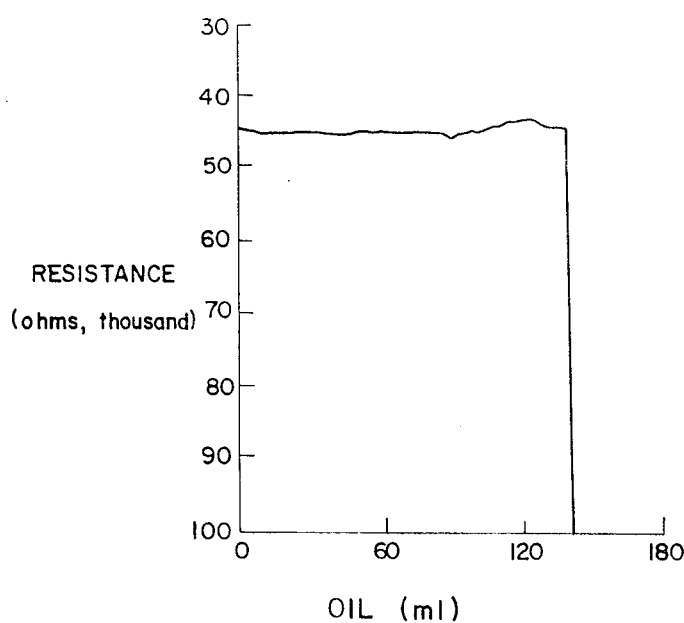
RECORDING OF RESISTANCE DURING EMULSIFICATION
OF A PORK MUSCLE EXTRACT (SLURRY).
DELIVERY RATE = 1ml/sec.
INVENTORS
NEIL B. WEBB
H. BRADFORD CRAIG
FRANCIS J. IVEY
*Finnegan, Henderson & Farabow*
ATTORNEYS RECORDING OF RESISTANCE DURING EMULSIFICATION OF A PORK MUSCLE EXTRACT (SUPERNATANT).
DELIVERY RATE = 1 ml/sec.

THE CONTINUOUSLY RECORDED ELECTRICAL RESISTANCE AND STABILITY OF AN EMULSION DURING COMMINUTION USING A BUFFALO-BOWL CHOPPER.

THE RESISTANCE AND STABILITY PATTERN OF AN EMULSION PREPARED IN A HOBART VERTICAL CUTTER MIXER.

STABILITY OF VARIOUS TYPES OF EMULSIONS AND THEIR RESISTANCE.

United States Patent Office 3,627,538
Patented Dec. 14, 1971

3,627,538
METHOD OF PRODUCING A SAUSAGE EMULSION
Neil B. Webb, 4019 Glen Laurel Drive 27609; Harris Bradford Craig, 3405 Ocotea St. 27607; and Francis J. Ivey, 905½ W. Peace St. 27605, all of Raleigh, N.C.
Filed June 17, 1969, Ser. No. 834,114
Int. Cl. A22c 11/00
U.S. Cl. 99—109                                  5 Claims

ABSTRACT OF THE DISCLOSURE

The resistance to direct current of emulsions having an aqueous protein-containing continuous phase and a fatty discontinuous phase is measured during formation of the emulsion. The measurements of direct current resistance can be made and recorded continuously by insertion of electrodes into the vessel in which the emulsion is formed. Because the resistance of the emulsion to direct current is related to emulsion stability, a food processor can use the resistance measurements as a process control tool to ensure the formation of stable emulsions.

---

Figure 3:
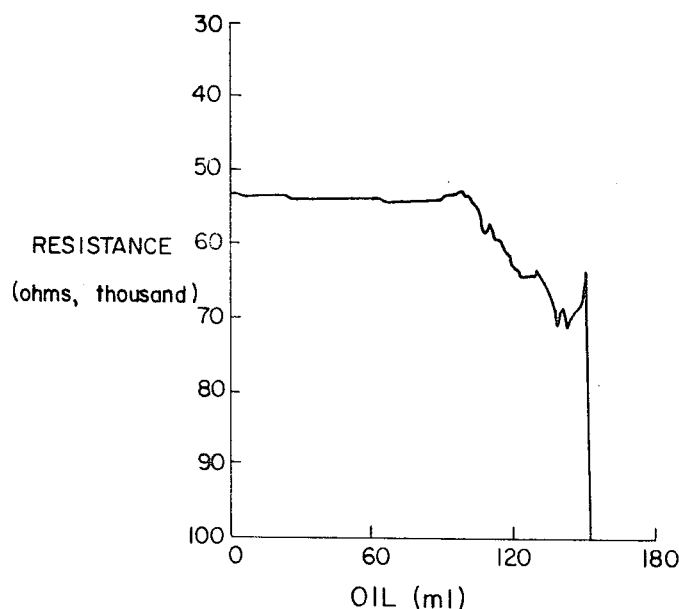

This invention relates to a method and apparatus for preparing stable protein-base emulsions; and more particularly, relates to a method and apparatus for producing stable meat emulsions by sensing the electrical conductivity of the emulsion.

The sausage industry has developed largely as an art, rather than through the application of scientific techniques. Presently, the manufacture of comminuted meat products, such as frankfurters and bologna, is usually conducted on an empirical basis. Generally, when sausage processing operations are performed by experienced operators, and on a batch basis, empirical relationships can produce satisfactory products. However, adequate information is lacking for solving sausage processing problems, and improving the products and the processing methods. In particular, it has been difficult to find accurate and rapid process control techniques for use in emulsion curing, the most important and complex operation in sausage making.

Emulsion curing, as generally conducted, involves 8–10 minutes of comminution, which converts ice, lean and fat meat, and curing and flavoring agents into batches of meat emulsion. One of the principal problems in this processing step is to bind the fat and meat protein into a stable emulsion. In the past, the problem of binding fat was frequently solved by limiting the degree of comminution of fatty tissues. A low level of fat dispersion was achieved, and consequently the amount of meat necessary for insuring emulsification of the fat was not excessive. Recently, however, due in part to an apparent consumer preference for sausage products possessing a homogeneous appearance, there has been a trend toward comminuting both lean and fat materials to a very fine state.

While experimental methods have been developed for testing the stability of an emulsion, these experimental methods are generally so slow that they are not suited for commercial quality control. The term "stability" is more specifically defined below, but in general refers to the ability of an emulsion to retain water and fat during storage or eheating procedures. For example, stability is usually expressed as units of mass of emulsion which remain after a controlled heating step (which causes unbound fat or oil to separate out) per one hundred units of existing emulsion. Stability testing methods have in the past generally involved either cooking the emulsion, or letting it stand for long periods of time.

There has been a continuing search for a method and an apparatus which would enable food processors to rapidly test protein-base food emulsions for stability, and thus provide an objective basis for the production of stable emulsions.

It has now been discovered that the resistance to direct current of a protein-oil emulsion can be correlated to emulsion stability. Thus, a sausage processor can first establish the desired relationship between resistance and stability and then by measuring the resistance of an emulsion to direct current, can determine emulsion stability.

The usefulness of measuring the resistance to direct current of sausage and other protein-abse emulsions is unexpected since in most electrolytes, direct current causes polarization at the electrodes inserted in the electrolyte, thus modifying the electrolyte and its electrical conductance. For most electrolytes, measurements of the resistance of DC current thus does not provide meaningful information. Consequently, alternating current is generally used in measuring the conductance of electrolytes.

One aspect of the present invention is the discovery that the resistance of a protein-base emulsion to direct current is more closely related to emulsion stability than to the level of fat or salt in the emulsion system. In contrast, the resistance to alternating current of protein-base emulsions is directly affected by the level of fat in the emulsion, and also the salt concentration of the emulsion.

The present invention involves testing the stability of emulsions by measuring the resistance of the emulsion to direct current. The invention provides a method of producing stable, protein-base emulsions including the steps of dispersing a mixture of disintegrated proteinaceous material and fatty material; continuously measuring the electrical resistance of the emulsion to direct current during the formation of the emulsion; and stopping the formation of the emulsion at a time when the measured electrical resistance of the emulsion is increasing or has reached a predetermined value.

The invention also includes an apparatus for producing stable, protein-base emulsions, including a holding vessel; dispersing means positioned within the vessel for comminuting and dispersing fat and a proteinaceous material placed in the vessel; a pair of spaced electrodes positioned within the vessel and below the normal level of emulsion in the vessel; a source of direct current attached to the electrodes; means for measuring and visually indicating the electrical resistance of the emulsion positioned between said electrodes; and control means for stopping the supply of power to the dispersing means when the electrical resistance to the emulsion to direct current passed through the spaced electrodes rises or reaches a predetermined value.

The present invention also provides a method for determining the stability of protein-base emulsions, that is emulsions in which the continuous phase comprises water and protein, and the discontinuous phase comprises a fatty material, such as a fat or oil. The stability of both animal and vegetable protein emulsions can be determined by the present invention. The invention can be used to determine the stability of both sausage-type emulsions during commercial production and emulsifying capacity-type emulsions under experimental or developmental conditions.

Figure 4:
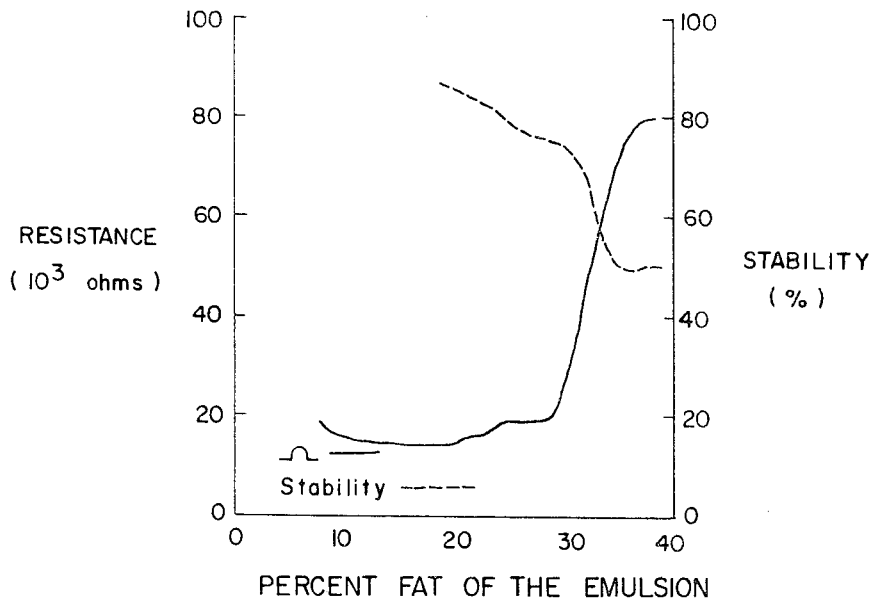
Figure 5:
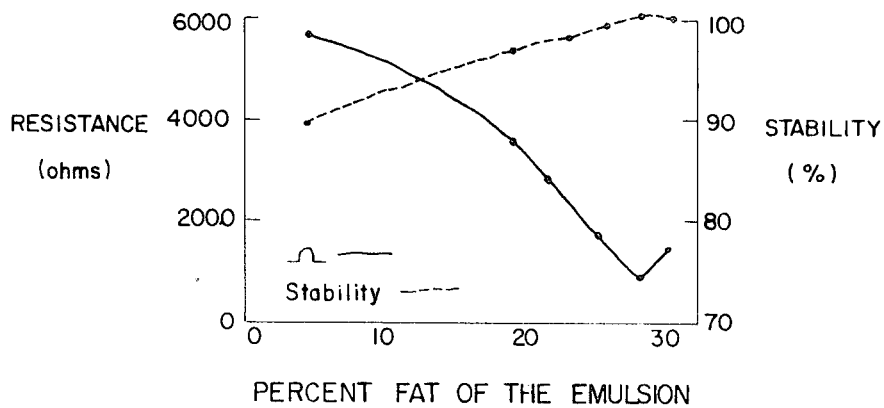
Figure 6:
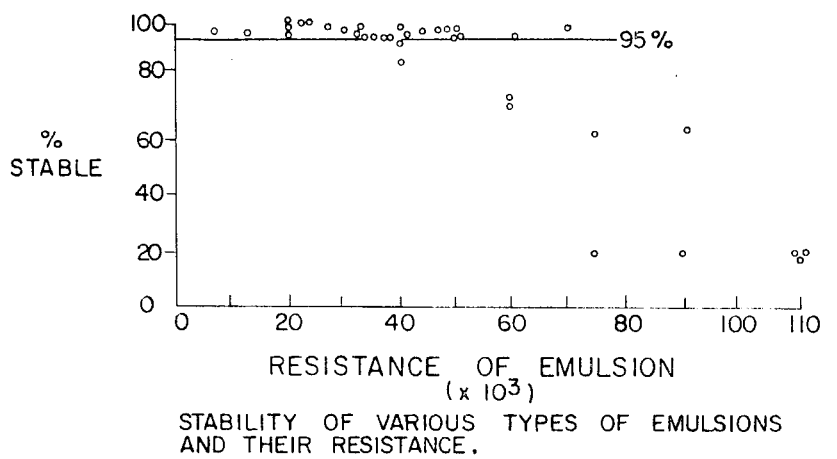

In the drawings:
FIG. 1 is a schematic illustration of the apparatus of the invention;
FIG. 2 is a graph showing the relationship of resistance and amount of oil added to a pork muscle extract (slurry);
FIG. 3 is a graph showing the relationship between resistance and the amount of oil added to pork muscle extract (supernatant);
FIG. 4 is a graph showing the relationship between resistance and stability, and percent fat for a typical meat emulsion comminuted in a Buffalo-bowl chopper;

FIG. 5 is a graph showing the relationship between resistance and stability, and percent fat for a typical meat emulsion comminuted in a Hobart vertical chopper-mixer; and FIG. 6 is a graph showing the relationship of emulsion resistance and stability for a variety of emulsions.

Sausage emulsions are usually formed from source materials containing both proteins and fatty materials and usually contain a limited amount of water, while the so-called emulsifying capacity emulsions are formed by adding a fat to a dilute aqueous solution or slurry of protein material.

Thus, the method of the invention can be used in a wide variety of food processing techniques, and can also be used to experimentally determine the emulsion capacity of pure protein material. The present method also provides an objective indication of the breakdown or inversion point of an emulsion.

In accordance with the method of the invention, protein-base emulsions are formed by dispersing a disintegrated proteinaceous material and a fatty material. This dispersing step can conveniently be accomplished by conventional chopping and/or grinding operations, which disintegrate the cellular structure of the protein and simultaneously disperse the resulting protein fragments and fatty material.

During the emulsion-forming step, it is sometimes desirable to add a fatty material to increase the fat content of the emulsion. For example, in experimentally determining the emulsifying capacity of a protein, a dilute aqueous slurry of the comminuted protein is formed by blending a given amount of protein in a given volume of salt solution. A liquid fatty material is continuously added to a sample of the slurry while mixing the fatty material and the proteinaceous material. In a similar fashion a liquid fatty material can be added to a solution containing salt soluble proteins to form the emulsion.

The addition of a fatty material to an emulsion during the emulsion forming operation is also used to increase the fat content of some food emulsions.

In accordance with the invention, the resistance of an emulsion to direct current, during the emulsion-forming step, is measured. As explained below, the measured resistance of the emulsion to direct current provides valuable information that enables a food processor to accurately control the degree of comminution and/or addition of fat so that stable food emulsions result.

The resistance measurements can be made intermittently, but preferably are made continuously and are recorded. By recording the measured resistance, graphs can be produced which relate electrical resistance to emulsion processing variables including the nature of the protein, the nature of the fat, the amount of water added, the temperature, the rate of mixing, the salt concentration, and the degree of comminution. The recorded measurements when placed in graphical form provide a convenient basis for predicting properties of future emulsions to be formed under similar processing conditions. As shown by the examples below, these graphs enable a food processor to stop the emulsion-forming process at a predetermined time at which the emulsion exhibits stability. Generally, the emulsion-forming process is stopped at a time when the resistance of the emulsion is increasing.

In another embodiment of the present method, it has been found that for a particular emulsion system, measurements of resistance to direct current can be used to determine the stability of emulsions by use of the relationship $$\text{Stability} = K(\log R)$$

where:

(a) Stability is expressed as the percentage of the original mass of an emulsion which remains after heating the emulsion for 30 minutes in a centrifuge tube placed in a 70° C. water bath and separating off the released fat and water;

(b) K is a constant which is determined for each type of proteinaceous material by physically measuring the stability and direct current resistance for at least one sample of emulsion, and inserting the measured quantities into the above equation and solving for K;

(c) R equals measured resistance of the emulsions in ohms.

An alternate method of testing stability is to experimentally determine the critical resistance point below which emulsions are stable and above which they are unstable. This level is determined for a specific set of experimental or production conditions using specific size sensing probes. FIG. 6 shows the resistance and stability for both emulsifying capacity-type and sausage-type emulsions using the same sensing probe. Resistance levels below 50,000 ohms were generally 95% stable, while above 50,000 ohms the emulsions were unstable. The higher the resistance the higher probability of low stability. It should be noted that the specific resistance level where instability occurs is dependent upon the type sensing probe and the type of emulsion preparation equipment.

The above relationship is valid for emulsions which contain a fixed weight percent of water. While the relationship between stability and the logarithm of resistance is not precisely linear, the use of an experimentally determined average value for "K" permits food processors to predict emulsion stability directly from measurements of resistance.

An embodiment of the apparatus of the invention is illustrated in FIG. 1. This apparatus is capable of performing the method of the invention and is effective for measuring emulsion stability during commercial sausage manufacturing operations.

In accordance with the apparatus of the invention, a holding vessel generally 10, is provided that includes a heat transfer jacket 12 which surrounds the interior wall of vessel 10 and provides a controlled environment for the emulsion-forming procedure. Jacket 12 is connected to a source of heat or a source of cooling liquid by inlet 14. An outlet 16 permits withdrawal of the heat supply or cooling liquid from the jacket 12.

In accordance with the invention, means are positioned within the vessel for comminuting and dispersing fat and proteinaceous material which are placed in the vessel. As here embodied, this means comprises an electrically driven mixer 18 having a paddle blade 20 with the shaft of the mixer extending vertically and the blade spaced a short distance from the bottom of the vessel. Preferably, a variety of mixer blades can be interchangeably mounted on the shaft, and the speed of the mixer can be varied to provide flexibility in comminuting and dispersing emulsions. Electric power is supplied to the mixer by line 21 and an on-off switch 22 is provided to start and interrupt the supply of power to the dispersing means.

In accordance with the invention, a pair of spaced electrodes is positioned within the holding vessel below the normal levels of emulsion in the vessel. A source of DC current is attached to the electrodes and means for measuring and visually indicating the electrical resistance of the emulsion are incorporated in an electrical circuit. As here embodied, electrodes 24 and 26 are connected to a circuit including a battery 28 and a recording ohmmeter 30. The electrodes are identically sized and are parallel. An on-off switch 32 is also provided in the circuit.

When an emulsion possessing electrolytic conductance qualities is present in holding vessel 10, and switch 32 is closed, it can be seen that direct current will flow from battery 28 to electrode 26 and across the emulsion to electrode 24. The electrical resistance of the emulsion between electrodes 24 and 26 is measured by recording ohmmeter 30. The measured electrical resistance can be used to stop the comminuting process at a predetermined level of electrical resistance which is known to provide a stable emulsion.

In the embodiment of the invention illustrated in the drawing, a supply reservoir 34 for liquid fatty materials provides a convenient means for addition of fatty material to the holding vessel during an emulsion-forming procedure. A conduit 36 connects the supply reservoir with the holding vessel, and a globe valve 38 is provided in the conduit to permit control of the supply rate of fatty material to the holding vessel. The lower end of conduit 36 is preferably positioned at the level of paddle blade 20 to insure rapid, efficient dispersal of fat throughout the emulsion. If desired, automatic control means for mixer 18 and valve 38 can be provided which respond to the current flow through the measuring circuit.

The following examples are merely illustrative of the invention, and are not to be understood as limiting the scope and principles of the invention. All percentages referred to herein are by weight unless otherwise specifically indicated.

EXAMPLE 1

In this example, the resistance to direct current of various proteinaceous emulsions is measured and recorded during the addition of purified soybean oil to various dilute protein-water mixtures including amberjack (*Seriola lalandi* Valenciennes), pork loin muscle, and beef chuck in an apparatus generally similar to that illustrated in FIG. 1.

A 15 g. protein sample and 60 g. of a 1.0 M NaCl solution are chilled to 1° C. and blended in a Waring blendor for 60 sec. at 7,000 r.p.m. The resultant slurry is diluted with 375 g. of 1° C., 1.0 M NaCl solution and the mixture is blended for 60 sec. at 10,000 r.p.m. Aliquots of the diluted slurry are taken for direct measurement of emulsifying capacity and/or the fractionation of salt soluble proteins. When salt soluble proteins are prepared, a 40 ml. aliquot of the slurry is centrifuged at 1° C. at 10,000 r.p.m. for 10 minutes. The supernatant is decanted and recentrifuged under the same conditions. The final supernatant is decanted and stored at 1° C. for subsequent emulsifying capacity determinations.

A 20-g. aliquot of protein sample (1° C.) and 10 g. of purified soybean oil are accurately weighed into a 400 ml. holding vessel. Various concentrations of protein mixtures and fractions can be used if adjustment is made for an equivalent level of protein in the sample at the time of the second dilution.

A 3-bladed propeller of a T-line stirrer, a resistance sensing unit, and an oil delivery unit are positioned in the vessel. The base of the propeller is positioned 5 mm. above the bottom of the vessel. The resistance sensing and the oil delivery units are attached so that the two electrode sensing probes are located 20 mm. above the bottom of the vessel, and the end of oil delivery conduit is 15 mm. above the bottom of the vessel. The oil delivery conduit is attached to an elevated oil reservoir and the delivery conduit is equipped with a variable-rate valve. The T-line stirrer is operated at 1600 r.p.m. for 15 sec. at which time continuous oil delivery is initiated at a rate of 1 ml./sec. The temperature of the oil is maintained at 23° C. The entire process is recorded on a Bausch and Lomb VOM recorder, Model Number 33–01–06 using the 100,000-ohm meter scale.

The resistance curves for the pork loin muscle are typical and are illustrated in FIGS. 2 and 3. The development and utilization of an electrical resistance curve to follow this process has the advantage of showing by objective measurement the stability of the emulsion during formation. At the point of emulsion breakdown (inversion), the electrical resistance drops abruptly as indicated by the recording graph; thereby indicating the maximum emulsifying capacity of the protein sample. The amount of oil added is determined by weight difference. The abrupt ending of recording electrical resistance is used as the critical end point for the determination of the maximum emulsifying capacity of the protein sample. This sudden increase in resistance occurs at the time of visual collapse of the emulsion.

EXAMPLE 2

In this example, sausage-type emulsions are formulated from lean beef chuck (12 days post-mortem) and lard by mixing a weighed amount of ground meat with 0, 20, 30 or 40 g. of water plus 2 g. of salt per 100 g. of meat. Lard is added to obtain the desired level of fat. The mixture is ground at high speed (250 r.p.m.) by two (2) passes through a Hobart Model N–50 grinder.

The procedure is repeated three (3) times at each level of moisture and fat, once using fresh meat and twice with frozen meat.

The electrical resistances of the resulting emulsions at varying levels of fat and added moisture are measured and recorded using an apparatus similar to that of FIG. 1. The stability of the emulsions is determined using the 30-minute heating procedure described in detail below.

About 30 g. of emulsion is weighed into a 20-mm. x 108 mm. centrifuge tube and heated for 30 minutes in a 70° C. water bath. The liquid released during the cook is poured into a graduated cylinder and the volume of the water and fat are each recorded. The weight of the unreleased solid emulsion is recorded. Stability is reported as the percent of the initial emulsion that is not released.

The stability and electrical resistance of the resulting sausage-type emulsions made with varying levels of fat and added moisture are shown in Table 1 below.

TABLE 1

| | | Grams of water added [a] | | | | | | | |
|---|---|---|---|---|---|---|---|---|---|
| | | 0 | 20 | 30 | 40 | 0 | 20 | 30 | 40 |
| | Rep. | Emulsion Stability [b] (percent) | | | | Logarithm of resistance | | | |
| 0% fat | a | 73.7 | 76.5 | 75.4 | 75.4 | 3.78 | 3.70 | 3.95 | 3.78 |
| | b | 85.3 | 88.0 | 88.4 | 88.0 | 3.48 | 3.62 | 4.03 | 4.11 |
| | c | 84.2 | 61.8 | 81.2 | 76.0 | 3.23 | 3.46 | 3.53 | 3.62 |
| 20% fat | a | 80.5 | 72.0 | 67.4 | 67.4 | 4.05 | 3.78 | 3.78 | 4.00 |
| | b | 80.0 | 67.5 | 77.4 | 69.3 | 3.87 | 3.78 | 4.00 | 4.16 |
| | c | 76.0 | 74.4 | 75.3 | 73.3 | 4.10 | 3.93 | 3.90 | 3.74 |
| 30% fat | a | 75.6 | 50.0 | 50.0 | 50.0 | 4.60 | 4.28 | 3.90 | 4.48 |
| | b | 50.0 | 67.6 | 65.4 | 63.3 | 4.58 | 4.25 | 4.23 | 4.20 |
| | c | 50.0 | 50.0 | 53.2 | 50.0 | 5.30 | 5.30 | 5.00 | 5.30 |
| 40% fat | a | 50.0 | 50.0 | 50.0 | 50.0 | 4.74 | 4.84 | 5.30 | 5.47 |
| | b | 50.0 | 50.0 | 64.6 | 61.0 | 5.70 | 4.30 | 4.48 | 4.53 |
| | c | 50.0 | 50.0 | 50.0 | 50.0 | 5.60 | 5.70 | 5.90 | 5.90 |

[a] Grams of added water per 100.0 grams of meat.
[b] A value of 50% was selected to indicate emulsions which were unstable but not readily separated into liquid and solid phases.

NOTE.—Coefficient of correlation between the stability and log of resistance was $R = -0.741$, where $R_{.01} = 0.372$. This coefficient indicates the relationship of change between the two factors. A coefficient of correlation ($R$) which is negative (−) means that as stability increased, the logarithm of resistance decreased. A negative value greater than 0.372 is significant at the 99% level of probability (i.e., $R_{.01} = 0.372$ for the number of samples used in this example, (Table 1). Thus, an $R = -0.741$ shows that the emulsion stability and resistance measurements are significantly related and that resistance is a valid method of evaluating stability of sausage emulsions.

EXAMPLE 3

In this example, the relationship between the resistance and the stability of sausage-type emulsions is determined at various degrees of comminution, and fat levels. The experiment is repeated three (3) times at each level of comminution and fat level, once with fresh, lean beef chuck (12 days post-mortem) and twice with lean beef chuck frozen at 2 days post-mortem.

A weighed amount of ground beef is mixed with 30 g. of water and 2 g. of salt per 100 g. of meat. Lard is added to give the desired fat level. The mixture of materials is mixed and ground at high speed (250 r.p.m.) through a Hobart Model N–50 grinder. After each pass through the grinder, the resistance is determined and the stability is determined using the 30-minute heating method described above. Grinding is performed in a 2° C. atmosphere to prevent temperature variations.

TABLE 2.—THE ELECTRICAL RESISTANCE AND STABILITY OF EMULSIONS WITH VARYING LEVELS OF FAT AND DEGREE OF COMMINUTION

|  | Rep. | Degree of comminution [a] | | | | | | | |
|---|---|---|---|---|---|---|---|---|---|
|  |  | 1 | 2 | 3 | 4 | 1 | 2 | 3 | 4 |
|  |  | Emulsion stability [b] (percent) | | | | Logarithm of resistance | | | |
| 0% fat | a | 79.4 | 76.4 | 73.4 | 74.0 | 3.92 | 3.78 | 3.85 | 3.92 |
|  | b | 82.6 | 83.6 | 89.2 | 85.0 | 3.93 | 3.60 | 3.48 | 3.40 |
|  | c | 83.2 | 86.6 | 88.0 | 88.0 | 3.54 | 3.57 | 3.58 | 3.62 |
| 20% fat | a | 62.0 | 68.0 | 76.4 | 79.4 | 4.20 | 3.92 | 4.20 | 4.42 |
|  | b | 78.0 | 73.3 | 73.3 | 74.0 | 3.60 | 3.54 | 3.65 | 3.78 |
|  | c | 72.7 | 79.2 | 80.4 | 80.4 | 3.70 | 3.64 | 3.70 | 3.75 |
| 30% fat | a | 67.4 | 50.0 | 50.0 | 50.0 | 4.70 | 4.85 | 5.70 | 5.85 |
|  | b | 62.3 | 50.0 | 50.0 | 50.0 | 3.91 | 4.02 | 4.45 | 5.65 |
|  | c | 66.6 | 65.2 | 67.4 | 66.4 | 3.79 | 3.73 | 3.79 | 3.81 |
| 40% fat | a | 67.0 | 50.0 | 67.6 | 65.2 | 5.48 | 6.00 | 6.00 | 6.00 |
|  | b | 50.0 | 50.0 | 50.0 | 50.0 | 5.11 | 4.83 | 5.60 | 6.30 |
|  | c | 66.6 | 63.6 | 60.2 | 65.5 | 3.90 | 3.93 | 3.97 | 4.30 |

[a] Degree of comminution corresponds to the number of times the emulsion was passed through the comminutor.
[b] Same as Table 1.

NOTE.—Coefficients of correlation between the stability and log of resistance were: $R_a = -0.674$, $R_b = -0.946$, $R_c = -0.746$, $R_{.01} = 0.606$.

The information developed from the tests outlined in this example is useful in a variety of ways to a sausage processor. For example, commercial production in a Hobart Model N–50 grinder of a 20% fat sausage type emulsion from beef chuck desirably involves 4 passes through the grinder for maximum stability.

EXAMPLE 4

The resistance to direct current and the stability patterns of emulsions comprising lean beef chucks (90% lean), frozen two (2) days post-mortem plus water and salt (ratio: 3:2:¼) and frozen pork trim (50% fat) are determined. The emulsions are formed by chopping the beef, water and salt in a Buffalo-bowl chopper for three (3) minutes and then slowly adding the pork trim while the resistance is continuously recorded. Initial temperature of the ingredients is 1° C., temperature after chopping is 16° C. Resistance measurements are obtained continuously using a measuring circuit similar to the battery-powered circuit illustrated in FIG. 1. Samples are taken at selected intervals for stability determinations using the 30-minute heating method described in Example 2 above.

The relationship of resistance and stability for the emulsions of this example are illustrated in FIG. 4 which shows that under the emulsion forming conditions of this example, stability remains above 75% if the emulsion forming process is stopped before the measured resistance reaches 20,000 ohms. Thus, in a commercial emulsion forming process, carried out in a Buffalo-bowl chopper, using lean beef chucks, water and salt; fat is added until the measured resistance rises to 20,000 ohms. At this time, comminution and the supply of additional fat are stopped. The resulting emulsion consistently exhibits a stability of over 75%.

This example illustrates one quality control technique for sausage making which utilizes the invention.

EXAMPLE 5

In this example, a sausage-type emulsion including the same ingredients described in Example 4 is formed by chopping the lean beef, water and salt for one (1) minute, at low speed, then adding one-half of the pork trim and chopping for thirty (30) sec. at high speed. The rest of the pork trim is added in two (2) equal lots and chopped for thirty (30) seconds at low speed between each addition. Initial temperature of the ingredients is 1° C.; the temperature after chopping is 15° C. The chopping was accomplished in a Hobart vertical cutter-mixer (VCM 40).

Periodically, the addition of fat and the chopping are stopped and a resistance measurement is made and a sample is taken for a stability determination. The relationship between resistance to direct current and stability for this emulsion is shown in FIG. 5. The emulsion reaches a maximum stability and minimum resistance at 29% fat.

FIGS. 4 and 5 show that the different comminuting apparatus and techniques used in Example 4, and this example cause a significant change in the amount of fat which results in the greatest emulsion stability.

In commercial operations using the Buffalo-bowl chopper and the Hobart vertical chopper-mixer, it is possible to accurately stop the addition of fat at the optimum level shown in FIGS. 4 and 5. This optimum level is about 20,000 ohms for the Buffalo-bowl chopper and about 1,000 ohms for the Hobart vertical cutter-mixer using the sensing probes designed for these examples and occurs at different fat concentrations. It is noteworthy that the design of the sensing probes determines the critical resistance level.

The invention in its broader aspects is not limited to the specific details shown and described. Variations may be made from such details without departing from the principles of the invention and without sacrificing its chief advantages.

What is claimed is:

1. A method of producing a sausage emulsion comprising commuting a mixture of ice, lean and fat meat, and flavoring agents to form a meat emulsion batter, measuring the resistance of the batter to direct current during the comminution step, and stopping the comminution of the ingredients of the emulsion when the electrical resistance of the batter reaches a predetermined value which corresponds to a desired level of emulsion stability.

2. A method of producing a stable, protein-base food emulsion comprising: forming a protein-base emulsion by comminuting a mixture of proteinaceous material and fatty material; continuously measuring the electrical resistance of the emulsion to direct current during the formation of the emulsion; and stopping the comminution of the emulsion when the electrical resistance of the emulsion reaches a given value which has been predetermined to result in a desired level of emulsion stability.

3. The method of claim 2 in which at least a portion of the fatty material is introduced into the emulsion during the emulsion-forming step, and the introduction of fatty material is stopped when the measured electrical resistance reaches the given value.

4. The method of claim 3 in which the fatty material is introduced in liquid form.

5. A method of determining the emulsifying capacity of a given proteinaceous food material comprising:
(a) forming a dilute mixture of comminuted proteinaceous material by blending a given amount of proteinaceous material in a given volume of salt solution;
(b) continuously adding a liquid fatty material to a sample of the dilute mixture while mixing the fatty material and the proteinaceous material; and
(c) measuring the electrical resistance of the emulsion to direct current during the addition of the oil to the emulsion.

References Cited

Gorbatov et al., "Proceedings of the European Meeting of Meat Processing Workers," 1969, pp. 1 to 49, article entitled Rheology of Minced Meat During Cooking.

HYMAN LORD, Primary Examiner

U.S. Cl. X.R.

17—35; 99—108, 233; 146—192; 324—65